(12) United States Patent
Chetzroni (10) Patent No.: US 10,025,857 B2
(45) Date of Patent: Jul. 17, 2018

(54) SLIDESHOW BUILDER AND METHOD ASSOCIATED THERETO

(71) Applicant: Joel Chetzroni, Québec (CA)

(72) Inventor: Joel Chetzroni, Québec (CA)

( * ) Notice: Subject to any disclaimer, the term of this patent is extended or adjusted under 35 U.S.C. 154(b) by 271 days.

(21) Appl. No.: 13/928,271

(22) Filed: Jun. 26, 2013

(65) Prior Publication Data

US 2015/0006497 A1    Jan. 1, 2015

Related U.S. Application Data

(60) Provisional application No. 61/665,024, filed on Jun. 27, 2012.

(51) Int. Cl.
*G06F 17/30* (2006.01)

(52) U.S. Cl.
CPC .............................. *G06F 17/30864* (2013.01)

(58) Field of Classification Search
CPC ................................................ G06F 17/30864
USPC ......................................... 707/728, 769, 756
See application file for complete search history.

(56) References Cited

U.S. PATENT DOCUMENTS

| | | | |
|---|---|---|---|
| 6,938,032 B1* | 8/2005 | Heath | G06F 17/30017 |
| 7,643,705 B1* | 1/2010 | Erol | G06F 17/30056 |
| | | | 382/305 |
| 8,341,528 B2* | 12/2012 | Chaudhary | G06F 17/3002 |
| | | | 715/730 |
| 8,812,945 B2* | 8/2014 | Sidon | G06F 17/3028 |
| | | | 715/202 |
| 2003/0222900 A1* | 12/2003 | Schramm-Apple | G06F 19/324 |
| | | | 715/730 |
| 2004/0001106 A1* | 1/2004 | Deutscher | G06F 17/30017 |
| | | | 715/838 |
| 2004/0145603 A1* | 7/2004 | Soares | 345/730 |
| 2005/0216431 A1* | 9/2005 | Baker | G06F 17/248 |
| 2005/0223314 A1* | 10/2005 | Varadarajan | G06F 17/248 |
| | | | 715/202 |
| 2008/0263010 A1* | 10/2008 | Roychoudhuri | G06F 17/30056 |
| 2011/0099507 A1* | 4/2011 | Nesladek | G01C 21/265 |
| | | | 715/780 |
| 2011/0196862 A1* | 8/2011 | Bergman | G06F 17/30056 |
| | | | 707/728 |
| 2012/0159332 A1* | 6/2012 | Piccinini et al. | 715/732 |
| 2013/0006695 A1* | 1/2013 | Haustein | G06Q 10/10 |
| | | | 705/7.26 |
| 2013/0332475 A1* | 12/2013 | Michelstein | G06F 17/211 |
| | | | 707/756 |

\* cited by examiner

*Primary Examiner* — Syling Yen
(74) *Attorney, Agent, or Firm* — Andrus Intellectual Property Law, LLP (57) ABSTRACT

A slideshow builder for dynamically building a slideshow to be presented on a client device including a database for storing topics and a collection of slides, each slide being associated to one of said topics, a search engine adapted to communicate with the client device, in order to receive a search query therefrom, the search query containing a search criterion including one of said topics, the search engine being in communication with the database in order to extract a set of one or more slide among the collection of slides, which match the search criterion, and to build, based on the extracted set, a slideshow to be presented on the client device.

20 Claims, 5 Drawing Sheets

SLIDESHOW BUILDER AND METHOD ASSOCIATED THERETO

PRIORITY

The present invention claims priority under 35 USC section 119 and based upon the provisional application 61/665,024 which was filed on Jun. 27, 2012

FIELD OF THE INVENTION

The present invention relates to the field of electronically supported learning. More particularly, the present invention relates to a slideshow builder, to a slideshow builder system, and to a method of operating the same.

BACKGROUND OF THE INVENTION

Accessing information on a very specific area of a broad field is challenging in the context of the presently existing media sources. For example, one may turn to books, encyclopedia, journals, articles, publications, Internet searches, etc., however, precise information on a particular subject matter within a broad field is difficult to obtain rapidly. Namely Internet searches, though rapid in retrieving search results, often lead to too many results. The searcher is left filtering through an abundance of results and is prevented from arriving to relevant information in a timely manner. It is a further challenge to obtain up-to-date information from a reliable source, especially in scientific fields, or the like, where knowledge constantly evolves.

Another challenge in searching for information based on keywords is that a searcher may not know the most effective keyword or combination of keywords to enter in order to quickly arrive to the sought information.

Yet another challenge is to obtain an adequate presentation format of the information sought.

The "slide" presentation format, as produced with Microsoft PowerPointy", is well known in the art. For example, slide presentations are often used in conferences or web-conferences in order to comprehensively present information on a given subject matter. This format is particularly adequate in the educational oimtext, since the subject matter is generally summarized, presented for easy viewing, together with a voice recording. A slide presentation is also easily transportable, and can be viewed from different devices and at a viewer's convenience.

However such slide presentations are typically accessible upon registration to a corresponding conference or web-conference. Additionally, searching for information on a very specific topic may still be challenging in that he/she may have to scan the content of the entire presentation, in order to determine whether the very specific topic sought is covered in the slide presentation. Keyword searches may be performed however, the resulting slides may not necessary correspond to the topic of interest, similarly to conventional Internet searches.

Hence, in light of the aforementioned, there is a need for an improved system which, by virtue of its design and components, would be able to overcome some of the above-discussed prior art concerns.

SUMMARY OF THE INVENTION

An object of the present invention is to gather slides concerning a specific topic, from a collection of slides from various sources.

Another object of the present invention is to dynamically build a slideshow from the collection slides based on user input parameters.

Another object of the present invention is to facilitate identifying a search topic in order to request the building of a corresponding slideshow.

In accordance with an aspect of the invention, there is provided a slideshow builder for dynamically building a slideshow to be presented on a client device, comprising:
  a database for storing topics and a collection of slides, each slide being associated to one of said topics;
  a search engine adapted to communicate with the client device, in order to receive a search query therefrom, the search query containing a search criterion including one of said topics, the search engine being in communication with the database in order to extract a set of one or more slide among the collection of slides, which match the search criterion, and to build, based on the extracted set, a slideshow to be presented on the client device.

According to embodiments of the slideshow builder, the slides stored in the database are sourced from various presentations.

According to embodiments of the slideshow builder, the topics are organized in the database so as to be presented on the client device in the form of a tree, to allow a user to identify a topic to search.

According to embodiment of the slideshow builder, each slide in the database is associated to at least one of the following parameters: a unique slide identifier; a source presentation; a presenter; a date; a relevance value in relation to the corresponding topic (or "rating" having values ranging from "not useful" to "very useful"); one or more other slide with which it must be paired ("peering"), a disable value (checked or unchecked); a type of slide (for example "summary slide"); a text content; a graphical content; a sound content (or "soundtrack") and a duration (i.e. the duration of the soundtrack). Each slide may be further associated to a popularity value (based on the number of viewings), and an appreciation value (for example, view-duration/slide-duration ratio in comparison to the similar ratio of other slides). The later parameters are dynamic as they are updated depending on user behavior and/or user Input. The rating may also be updated dynamically by taking into account rating information input by viewers, and/or a default rating indicative of the relevance level may be associated with each slide. User entered comments may also be associated to each slide (for the benefit of other viewers, for generating interest and/or for measuring the general interest in a particular slide).

In accordance with another aspect, there is provided a search engine for dynamically building a slideshow to be presented on a client device, the search engine being adapted to communicate with a database storing topics and a collection of slides, each slide being associated to one of said topics, the search engine comprising:
  a client communication module for communicating with the client device, in order to receive a search query therefrom, the search query containing a search criterion including one of said topics;
  an extractor for extracting a set of one or more slide among the collection of slides in the database, which match the search criterion; and an assembler for assembling, based on the extracted set, a slideshow to be presented on the client device.

In accordance with another aspect of the invention, there is provided a slideshow builder system for dynamically building a slideshow, comprising:
- a database for storing topics and a collection of slides, each slide being associated to one of said topics;
- a client device for generating a search query containing a search criterion including one of said topics
- a search engine being In communication between the client device and the database, In order to extract a set of one or more slide from the database among the collection of slides, which match the search criterion. and to return a slideshow based on the extracted set of one or more slides to the client device for presentation.

In accordance with another aspect of the invention, there is provided a method of dynamically building a slideshow to be presented on a client device, the method comprising:
- a) receiving a search query at a search engine from the client device, the search query containing a search criterion including a topic;
- b) extracting a set of one or more slide among a collection of slides stored in a database, which match the search criterion;
- c) building a slideshow from the extracted set of one or more slides; and
- d) sending the built slideshow to the client device for presentation on a user interface of the client device.

According to embodiments of the present invention, the building of step (c) includes organizing the slideshow in accordance with a set of rules stored in a memory.

According to an embodiment of the present invention, the set of rules if step (c) includes at least one of the following rules:
- filtering the slides among the extracted set for example removing a slide, when it is indicated as "disabled" (for example in the case of orphan slides which are not associated to any of the topics);
- sorting the slides among the extracted set based on sorting data associated to each slide, the sorting data may include: a relevance value (or "rating"), a popularity value, an appreciation value, a type associated to each slides (for example "summary" type slides must be positioned at the end of a slide show), and/or a pairing parameter (for example "previous peer", "next peer").

In accordance with another aspect of the invention, there is provided a computer-readable storage medium for dynamically building a slideshow to be presented on a client device, the storage medium having stored thereon data and instructions for execution by a computer to:
- a) receive a search query at a search engine from the client device, the search query containing a search criterion including a topic;
- b) extract a set of one or more slide among a collection of slides stored in a database, which match the search criterion;
- c) build a slideshow from the extracted set of one or more slides; and
- d) send the built slideshow to the client device for presentation on a user interface of the client device.

Embodiments of the present invention are particularly advantageous in that slides relevant to a very particular topic are easily extracted from a collection of indexed slides, sourced from different presentations, to obtain a collective set of slides which are then integrated into a unitary slideshow. Additionally, presenting the topics to the user in the form of a tree is advantageous in that the need for keyword searches is considerably reduced and the search parameters are quickly determined. Another advantage of the present invention according to embodiments thereof concerns the building of the slideshow according to a set of rules which aims to organize the slides in a comprehensive manner for increased coherence between the slides from the different sources.

The objects, advantages and features of the present invention will become more apparent upon reading of the following non-restrictive description of preferred embodiments thereof, given for the purpose of exemplification only, with reference to the accompanying drawings.

DETAILED DESCRIPTION

In the following description, the same numerical references refer to similar elements. The embodiments mentioned and/or geometrical configurations and dimensions shown in the figures or described in the present description are embodiments of the present invention only, given for exemplification purposes only.

Broadly described, the slideshow builder according to a preferred embodiment of the present invention, as exemplified in the accompanying drawings, allows a user to easily retrieve and view a set of slides which may have different sources but which are related to a particular subject matter which the user seeks to obtain information on.

Figure 1:
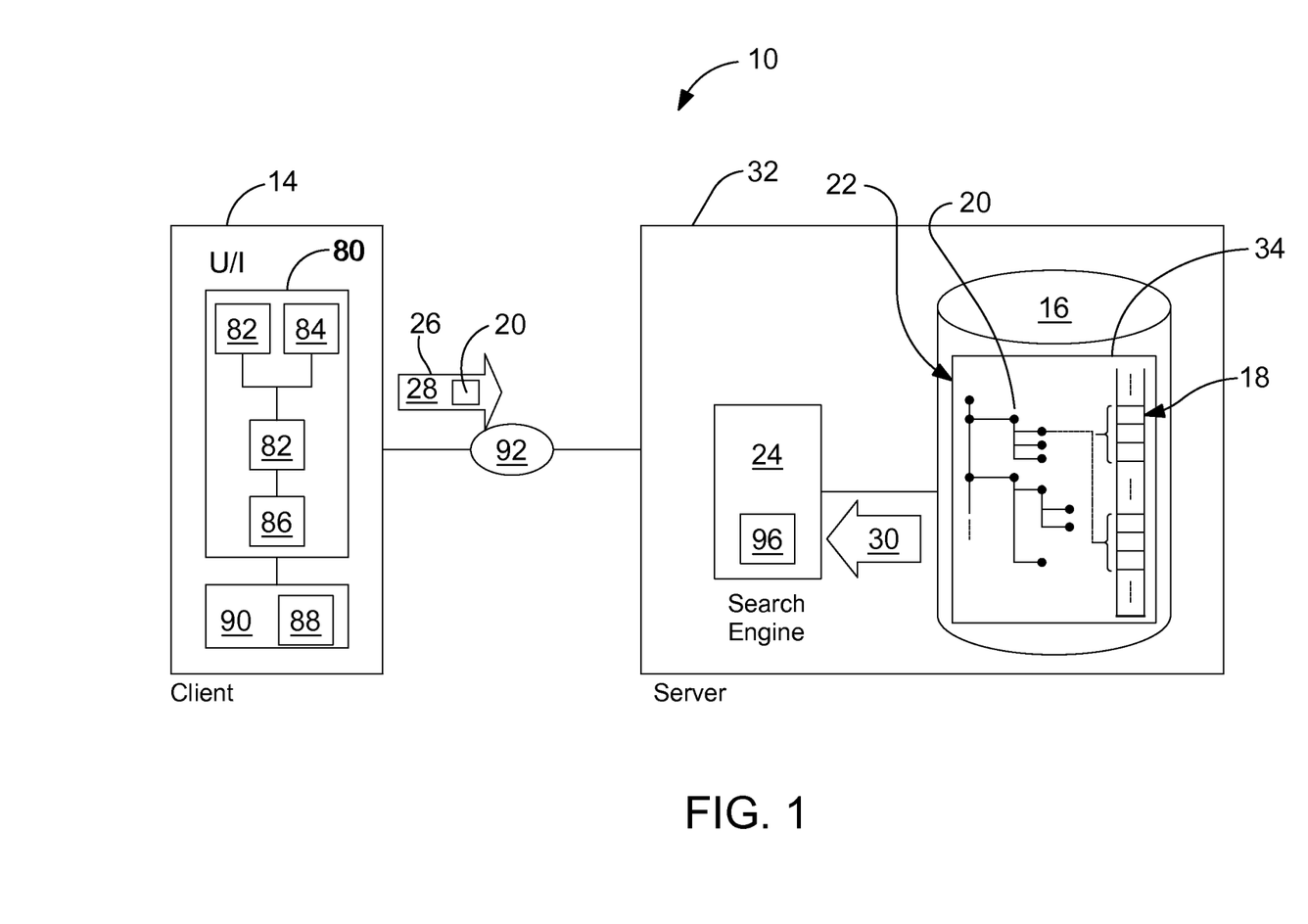
FIG. 1 is a block diagram of a slideshow builder system, according to an embodiment of the present invention.

Thus, as better illustrated in FIG. 1, there is provided a slideshow builder 10 for dynamically building a slideshow 12 to be presented on a client device 14.

Preferably, the slideshow builder 10 comprises:
- a database 16 for storing topics 20 and a collection of slides 18, the topics 20 being organized in the database 16 in the form of a tree 22, each slide 18 being associated to one of said topics 20;
- a search engine 24 adapted to communicate with the client device 14, in order to receive a search query 26 therefrom, the search query 26 containing a search criterion 28 including a topic 20, the search engine 24 being in communication with the database 16 in order to retrieve a set 30 of one or more slide 19, which match the search criterion 28, and to build a corresponding slideshow 12 to be presented on the client device 14.

Thus, the slides 18 are indexed in order to facilitate extraction upon receiving a search query.

The database 16 and search engine 24 are provided within a server 32. The server 32 Is provided by a general purpose computer, or the like. The content of the database 16 is stored in a memory 34 of the server 32.

It is to be understood that, in an alternate embodiment, the database, the search engine and/or components thereof may be provided by a plurality of such computers being in communication with each other so as to cooperate for adequately providing a slideshow builder as described herein. For example, it is to be understood that the search engine or a portion thereof may be located in the client device.

Database

Referring back to FIG. 1, the collection of slides 18 stored in the database 16 are sourced from various sources, such as a conference or web-conference presentation, course material, and/or the like.

In an alternate embodiment, the collection of slides may be provided by a single source.

It is to be understood also, that the slides may have different presentation formats. In such a case, the source slides are preferably converted into a standard format such that the collection of slides has a uniform format. it is to be understood that according to alternate embodiments, the conversion may be performed at any suitable step, in the preparation of the collection of slides or during operation of the system, for example, the slides may be converted dynamically upon retrieval by the client device, as may be understood by a person skilled in the art.

Figure 2:
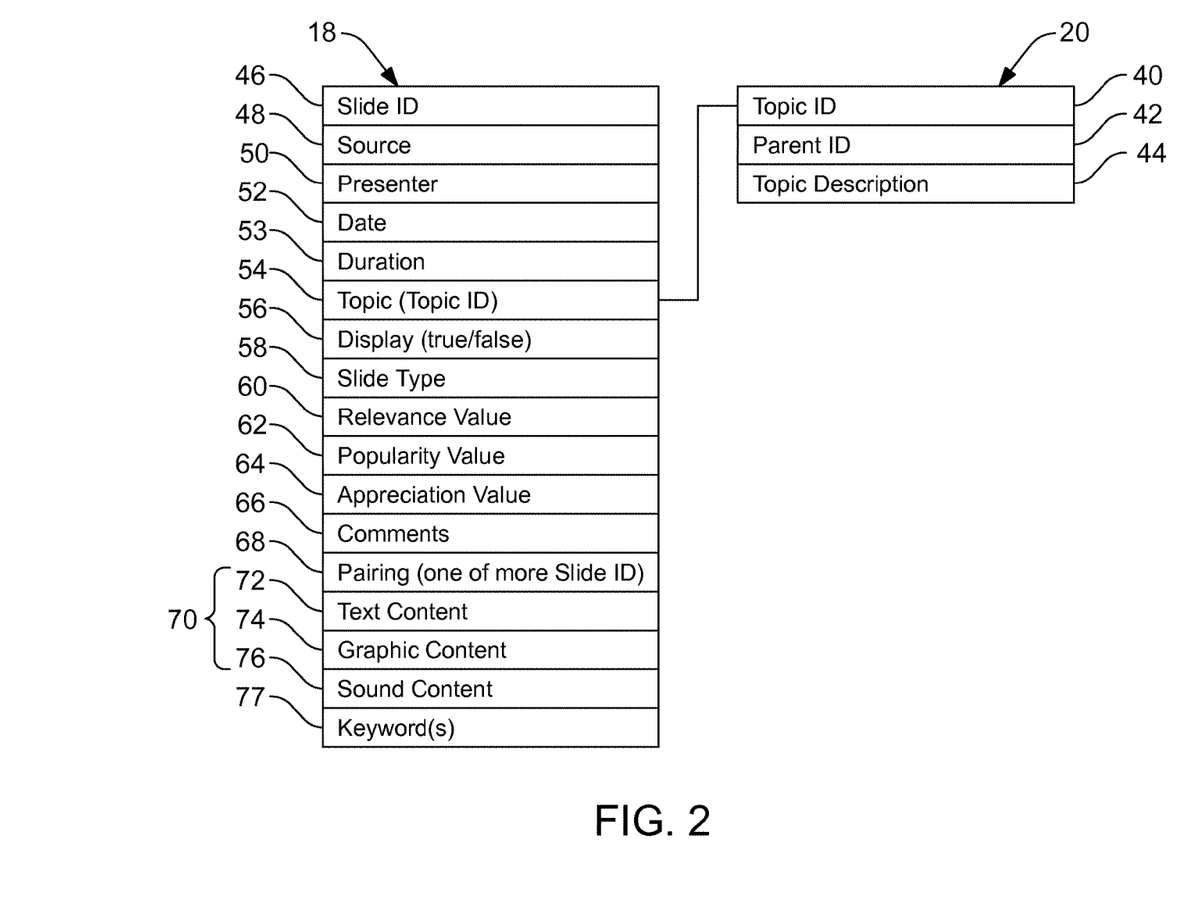
FIG. 2 is a schematic representation of a data structure of a database of the slideshow builder shown in FIG. 1

A data structure of the collection of slides 18 and topics 20, according to the described embodiment, is exemplified in FIG. 2. Furthermore, FIG. 5 shows a screenshot of an exemplary display on a server side 32 application 33 for managing the slides 18.

As previously mentioned, the topics 20, are organized in a tree format 22 (see FIGS. 1 and 5) having nodes. This tree format 22 is reproduced on the client side 14 in order to facilitate identifying the search criteria, as will be better explained further below. The topics 20 are thus each associated to a parent node 42. Each topic is further identified by a unique identifier 40 and has a descriptive label ("topic description") 44, to be displayed in the tree on the client device 14.

Each slide 18 is associated with a unique identifier 46 ("Slide ID"), a source 48 (for example, the name of a conference during which it was presented), a presenter 50, a date 52 (date of the conference), a duration 53 of the slide (for example, the duration of a soundtrack 76 associate with the slide) and a particular topic 54 which corresponds to a topic identifier 40 of the corresponding topic 20.

Figure 5:
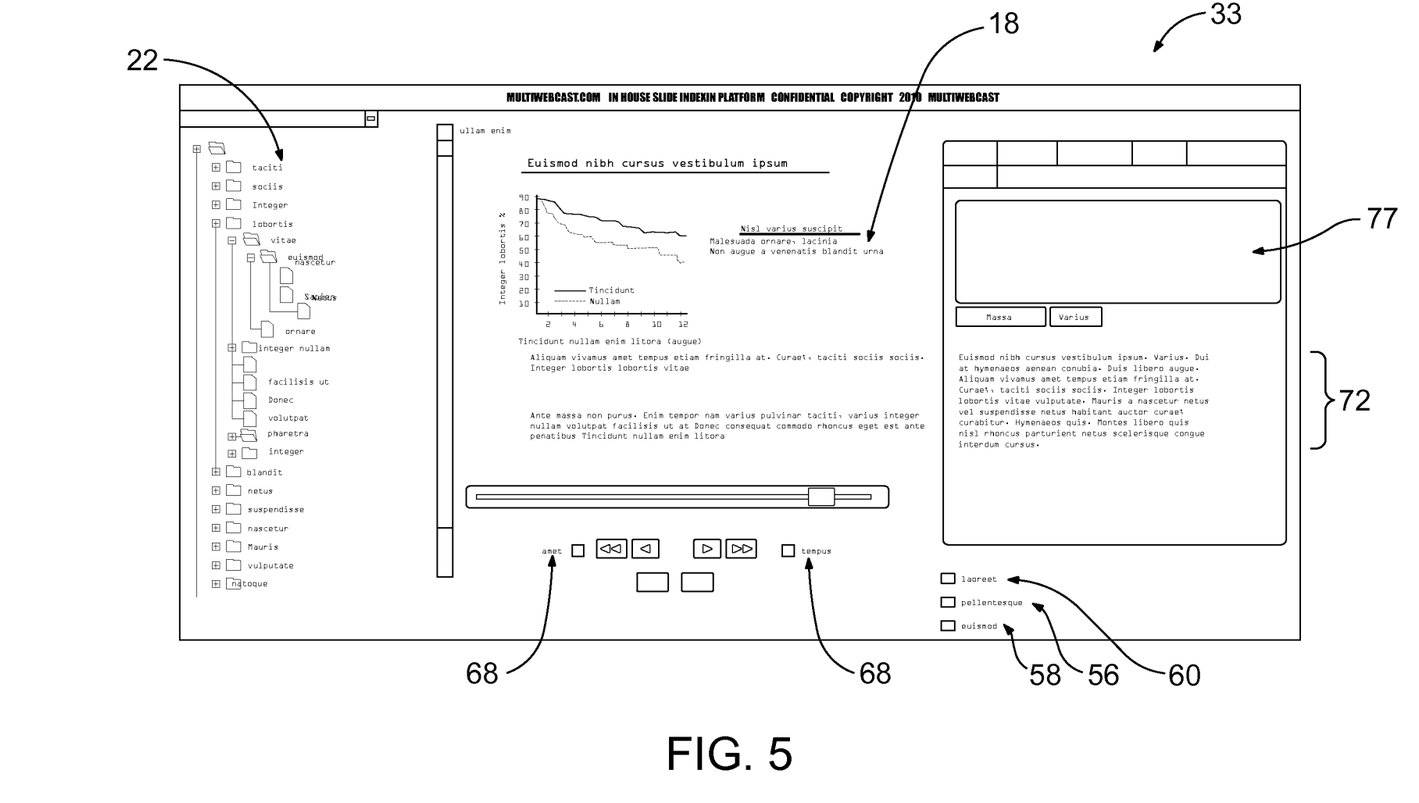
FIG. 5 is a screenshot of a window appearing on a server device of a slideshow builder system, according to an embodiment of the present invention.

Other parameters are associated to each slide, for processing when building a slideshow, as better shown in FIG. 5. A "disable" field 56 is checked (see FIG. 5), when the particular slide 18 is not to be displayed. It is to be understood that the slide may also be omitted from a slide show under certain conditions. A slide type 58 may be assigned. For example a "summary" type slide will be processed to appear at the end of a slideshow. A relevance value (or "rating") 60 is further associated to each slide 18 in order to quantify the relevance of the content of the slide 18 in relation to the topic 20. A slide is also assigned a popularity value 62 which represents the number of times the slide has been viewed, and an appreciation value 64 which corresponds to the ratio of view-duration relative to slide-duration 53, in comparison to the similar ratio of other slides. Comments may be further entered by users so as to produce a comment-related indicia 66 associated with each slide 18. The number of comments or amount of comments is preferably taken into account in order to obtain an indication of the interest which is generated by a particular slide. For example, if many comments are exchanged for a particular slide, it is an indication that the slide is of higher interest than another slide having no comments associated thereto. The slide 18 may be further paired with one or more slides ("pairing" 68), in order to force the slide 18 to be shown together with this one or more slide when it is integrated into a slideshow.

Some of the above-parameters are dynamically updated depending on user behavior and/or user input. For example, the relevance value 60 may be established in the database, and/or it may be updated based on user input. The popularity value 62, the appreciation value 64 and comment-related indicia 66 are updated based on viewer behavior, as can be understood.

The content 70 of each slide 18, includes text 72 (for keyword search parameter), graphical 74 (images and slide layout) and sound 76 (for keyword search parameter). Additional keywords 77 may be further associated with any given slide.

Client Device

In the context of the present invention, the term "client device" refers to any suitable device and/or equipment for presenting a slideshow, such as a computer, a tablet computer, a smart phone and/or the like as can be easily understood by a person skilled in the art.

In the embodiment shown in FIG. 1, the client device 14 includes a user interface 80 including a display screen 82 and a sound output 84. The display screen 82 displays the slides of the slideshow 12 and the sound output 84, which may be a speaker for example, outputs the soundtrack 76 associated with each slide 18 of the slideshow 12. The user interface 80 further includes a user control 86, such as a keyboard, touchscreen, mouse; and/or the like, allowing a user to generate a slideshow 12 and to selectively view the slides 18 of the slideshow 12. The client device 14 comprises a client module 88 which is in communication between with the search engine 24 and the user interface 80, in order to generate a query 26 based on a user selection received from the user control 86 and to present the slideshow 12 on the user interface 80, from the data returned from the search engine 24. The client module 88 comprises software, in the form of computer readable data and instructions stored on a memory 90 of the client device 14.

The client device 14 is in communication with the server 32 over a communication network 92, namely the Internet.

It is to be understood that a communication network may be provided by any suitable network including a computer network such as a Wide area network (WAN), a local area network (LAN), etc., which may be provided by cable and/or wireless connection(s).

Operation

Figure 3:
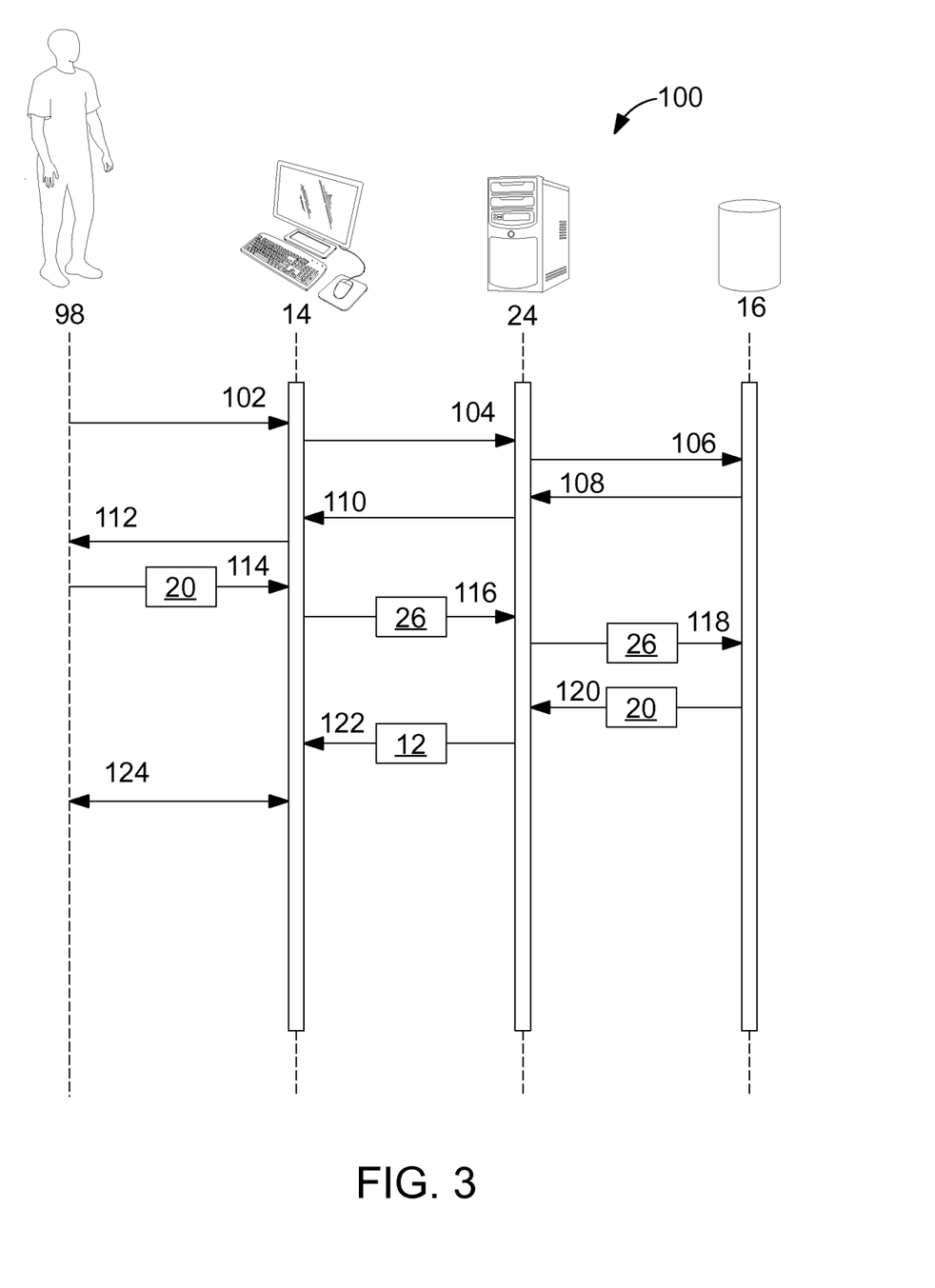
FIG. 3 is a sequence diagram showing the operation of a slideshow builder system, in accordance with another embodiment of the present invention.

The operation 100 of the slideshow building system according to an embodiment of the present invention will now be described with reference to FIGS. 1 and 3.

Figure 4:
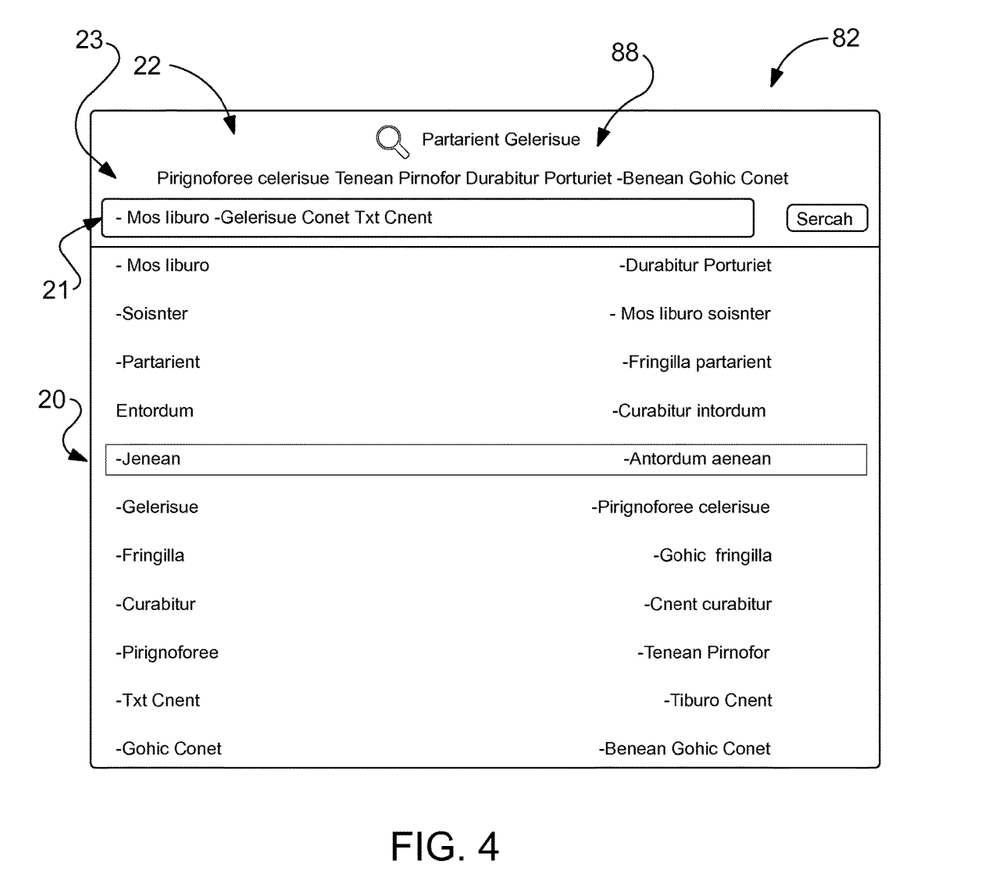
FIG. 4 is a screenshot of a window appearing on a client device of a slideshow builder system, according to an embodiment of the present invention.

With further reference to FIG. 4, it can be seen that a user 98 accesses the application 88 on the client device 14, via a display screen 82 (at steps 102, 104, 106). The topics 20 are presented in a tree format 22 on the display screen 82 (at steps 108, 110, 112). The user 98 selectively chooses (at step 114) a desired topic by developing a branch 23 of the tree 22 based on the options given in the tree (from a broader subject matter 21 to a more specific topic 20). Further to determining the topic 20, the user 84 submits a request (still at step 114) to build a slideshow based on the chosen topic 20. This generates a query 26 sent to the database 16 containing a search criteria 28 based on the chosen topic 20 (at step 116).

It is to be understood that additional search criteria may be input by the user 84 in order to refine the resulting slideshow. For example, additional search criteria may include the name of a specific conference, a date, or range of dates, name of presenter, etc. The additional search criteria may be provided in a drop-down list created dynamically by interrogating the database 16 depending on the choice of topic 20. Additional search criteria may include one or more keyword, in order to further refine the search.

The search engine 24 communicates (at step 118) with the database 16 in order to retrieve (at step 120) all the slides 30 which correspond to search criteria 28. A keyword search criteria may further be used in order to refine the resulting slides 30 to correspond to one or more keywords, either presented or shown on each slide. Thus, the keyword search allows retrieving slides by searching for the keyword in the text content 72, the graphic content 74, and the sound content 76 and/or among the attributed keywords 77 of each of the slides corresponding to the chosen topic 20.

The resulting set 30 of slides 18 is then processed by the search engine 24 in order to organize the corresponding slides 18 into a slideshow 12, in accordance with rules 86. More particularly, the search engine 24 takes into account the disable 56 value, the slide type 58, the relevance 60, popularity 62, appreciating 64, and comment-related 66 values, as well as pairing 68 (see FIG. 2) in order to organize the slides 18 into a unitary slideshow 12.

Slides having a disable value 56 which Is activated (for example, in cases where the slide is not associated to any particular topic, or when a particular condition is not met by this slide, etc.) are omitted from the slideshow 12. This is the case for a slide showing only a title or a table of contents. The slide type 58 is processed, for example, by placing slides marked as "summary" toward the end of the slideshow 12.

The relevance 60, popularity 62, appreciating 64, and comment-related 66 values, are processed in order to sort the remaining slides in a logical manner. Slides referring to other slide(s) for pairing 68 are agglomerated to be presented sequentially together. For example, the pairing 68 may indicate a slide that should precede or follow a particular slide ("previous peer" or "next peer", as illustrated in FIG. 5).

Thus, the resulting slideshow 12 is built in a logically organized manner so as to improve comprehension by the viewer.

The built slideshow 12 is sent (at step 122) to the client device 14 for viewing (see step 124) by the user 84. The user control 76 allows the user 84 to leaf through the slideshow 12.

The above-described embodiments are considered in all respect only as illustrative and not restrictive, and the present application is intended to cover any adaptations or variations thereof, as apparent to a person skilled in the art. Of course, numerous other modifications could be made to the above-described embodiments without departing from the scope of the invention, as apparent to a person skilled in the art.

a) receiving a search query at a search engine from the client device, the search query containing a search criterion including a topic;

b) extracting a set of one or more slide among a collection of slides stored in a database, which match the search criterion;

c) building a slideshow from the extracted set of one or more slides; and    d) sending the built slideshow to the client device for presentation on a user interface of the client device.

According to embodiments of the present invention, the building of step (c) includes organizing the slideshow in accordance with a set of rules stored in a memory.

According to an embodiment of the present invention, the set of rules if step (c) includes at least one of the following rules:

filtering the slides among the extracted set for example removing a slide, when it is indicated as "disabled" (for example in the case of orphan slides which are not associated to any of the topics);

sorting the slides among the extracted set based on sorting data associated to each slide, the sorting data may include: a relevance value (or "rating"), a popularity value, an appreciation value, a type associated to each slides (for example "summary" type slides must be positioned at the end of a slide show), and/or a pairing parameter (for example "previous peer, "next peer").

In accordance with another aspect of the invention, there is provided a computer-readable storage medium for dynamically building a slideshow to be presented on a client device, the storage medium having stored thereon data and instructions for execution by a computer to:

a) receive a search query at a search engine from the client device, the search query containing a search criterion including a topic;

b) extract a set of one or more slide among a collection of slides stored in a database, which match the search criterion.

What is claimed is:

1. A slideshow builder for dynamically building a slideshow to be presented on a client device, comprising:

a memory or a processor;

a database for storing a collection of slides from multiple different source presentations, each source presentation comprising two or more slides, wherein the database is organized as a set of topic nodes and subtopic nodes so as to be presented on the client device in the form of a tree with each topic node being associated with one or more subtopic nodes;

wherein the slides from each of the multiple different source presentations are individually associated to one of said topic nodes or subtopic nodes based on the content of the respective slide;

a search engine adapted to:

communicate with the client device to receive a search query therefrom, the search query containing a search criterion including one of said topics or subtopics;

search the topic nodes and the subtopic nodes of the database based on the search criterion to extract a set of one or more slides associated with at least one relevant topic node or the subtopic node; and       integrate the slides in the extracted set to generate a unitary slideshow, and transmit the slideshow to be presented on the client device.

2. A slideshow builder for dynamically building a slideshow to be presented on a client device as in claim 1, wherein the multiple different source presentations are each one of a conference presentation, a web-conference presentation, or an academic course presentation.

3. A slideshow builder for dynamically building a slideshow to be presented on a client device as in claim 1, wherein each source slide is associated to the one of said topic nodes or subtopic nodes by a relevance value, wherein the relevance value quantifies the relevance of content of the slide to the topic node or subtopic node on a scale ranging from least useful to most useful.

4. A slideshow builder for dynamically building a slideshow to be presented on a client device as in claim 1, wherein each source slide in the database is associated to at least one of the following parameters: a unique slide identifier; a source presentation; a presenter; a date; a relevance value in relation to the corresponding topic or subtopic; one or more other slide with which it must be paired; a disable value; a type of slide; a duration; a popularity value; and an appreciation value.

5. A slideshow builder for dynamically building a slideshow to be presented on a client device as in claim 4, wherein the parameters are updated dynamically depending on user behavior and/or user input.

6. A slideshow builder for dynamically building a slideshow to be presented on a client device as in claim 5, wherein the parameters are also updated dynamically by taking into account rating information input by one or more viewers.

7. A non-transitory computer-readable medium for dynamically building a slideshow to be presented on a client device, comprising instructions stored thereon that, when executed on a processor, perform the steps of:
  communicating with a database storing a collection of slides from multiple different source presentations, each source presentation comprising two or more slides, wherein the database is organized as a set of topic nodes and subtopic nodes, each topic node and subtopic node being associated to slides from two or more of the multiple source presentations by a relevance value;
  communicating with the client device, in order to receive a search query therefrom, the search query containing a search criterion including a topic or a subtopic;
  searching the topic nodes and the subtopic nodes of the database based on the search criterion to locate one or more relevant topic nodes or subtopic nodes;
  extracting a set of one or more slides—associated with the relevant topic nodes or subtopic nodes; and
  integrating the one or more slides of the extracted set into a unitary slideshow to be presented on the client device, wherein the slides of the extracted set are integrated based on the relevance value.

8. A non-transitory computer-readable medium for dynamically building a slideshow to be presented on a client device as in claim 7, wherein the topics are organized in the database so as to be presented on the client device in the form of a tree, to allow a user to identify the search criterion by selecting at least one of the topic nodes or subtopic nodes.

9. A non-transitory computer-readable medium for dynamically building a slideshow to be presented on a client device as in claim 7, wherein each slide in the database is associated to at least one of the following parameters: a unique slide identifier; a source presentation; a presenter; a date; one or more other slides with which it must be paired; a disable value; a type of slide; a text content; a graphical content; a sound content; a duration; a popularity value; and an appreciation value, and wherein the slides of the extracted set are further assembled based on at least one of those parameters.

10. A non-transitory computer-readable medium for dynamically building a slideshow to be presented on a client device as in claim 9, where in the parameters are updated dynamically depending on user behavior and user input.

11. A non-transitory computer-readable medium for dynamically building a slideshow to be presented on a client device as in claim 10, wherein the parameters are also updated dynamically by taking into account rating information input by viewers.

12. A method of dynamically building a slideshow to be presented on a client device, the method comprising the steps of:
  providing a database having topic nodes and subtopic nodes;
  adding a collection of slides from multiple different source presentations to the database by:
    receiving each of the multiple source presentations, each source presentation comprising two or more slides;
    determining a topic identifier for each slide based on a content of the respective slide;
    for each slide, locating a topic node or a subtopic node in the database based on the topic identifier;
    storing each slide in the database in association with the located topic node or the subtopic node;
  receiving a search query at a search engine from the client device, the search query containing a search criterion including a topic or a subtopic;
  searching the topic nodes and the subtopic nodes of the database to identify a set of one or more slides based on the search criterion, wherein the set of one or more slides is a subset of the collection of slides from the multiple difference source presentations;
  extracting the set of one or more slides among a collection of slides stored in the database;
  integrating the slides in the extracted set to generate a unitary slideshow; and
  sending the slideshow to the client device for presentation on a user interface of the client device.

13. A method of dynamically building a slideshow to be presented on a client device as in claim 12, wherein the building step includes organizing the extracted set of one or more slides into the slideshow in accordance with a set of rules stored in a memory.

14. A method of dynamically building a slideshow to be presented on a client device as in claim 12, wherein the building step includes removing a slide from the extracted set when it is indicated as disabled.

15. A method of dynamically building a slideshow to be presented on a client device as in claim 12, wherein the building step includes sorting the slides among the extracted set based on sorting data associated to each slide, the sorting data including: the relevance value, a popularity value, an appreciation value, a type associated to each slide, and a pairing parameter.

16. A method of dynamically building a slideshow to be presented on a client device as in claim 12, further comprising presenting topics on the client device in the form of a tree, wherein the receiving step includes receiving the topic selected on the tree presented on the client device.

17. A non-transitory computer-readable medium for dynamically building a slideshow to be presented on a client device as in claim 7, wherein the relevance value quantifies the relevance of content of the slide to the topic on a scale ranging from least useful to most useful.

18. A method of dynamically building a slideshow to be presented on a client device as in claim 12, further comprising:
  determining a relevance value relating each source slide to the topic node or the subtopic node, wherein the relevance value quantifies the relevance of the content of the source slide to a topic description of the topic node or the subtopic node;
  wherein at least one of the extracting step further includes extracting the set of one or more slides based on the relevance value in relation to the topic or subtopic of the search criteria, and the building step includes selecting one or more slides from the extracted set for inclusion in the slideshow based on the relevance value.

19. A method of dynamically building a slideshow to be presented on a client device as in claim 18, wherein the relevance value quantifies the relevance of content of the slide to the topic or subtopic on a scale ranging from least useful to most useful.

20. A method of dynamically building a slideshow to be presented on a client device as in claim 12, wherein the topic identifier for each slide is determined based on at least one of a text content, a graphical content, a sound content, and a duration of the respective slide.

\* \* \* \* \*